Figures 1, 2, 3, 4, 5, 6, 7:
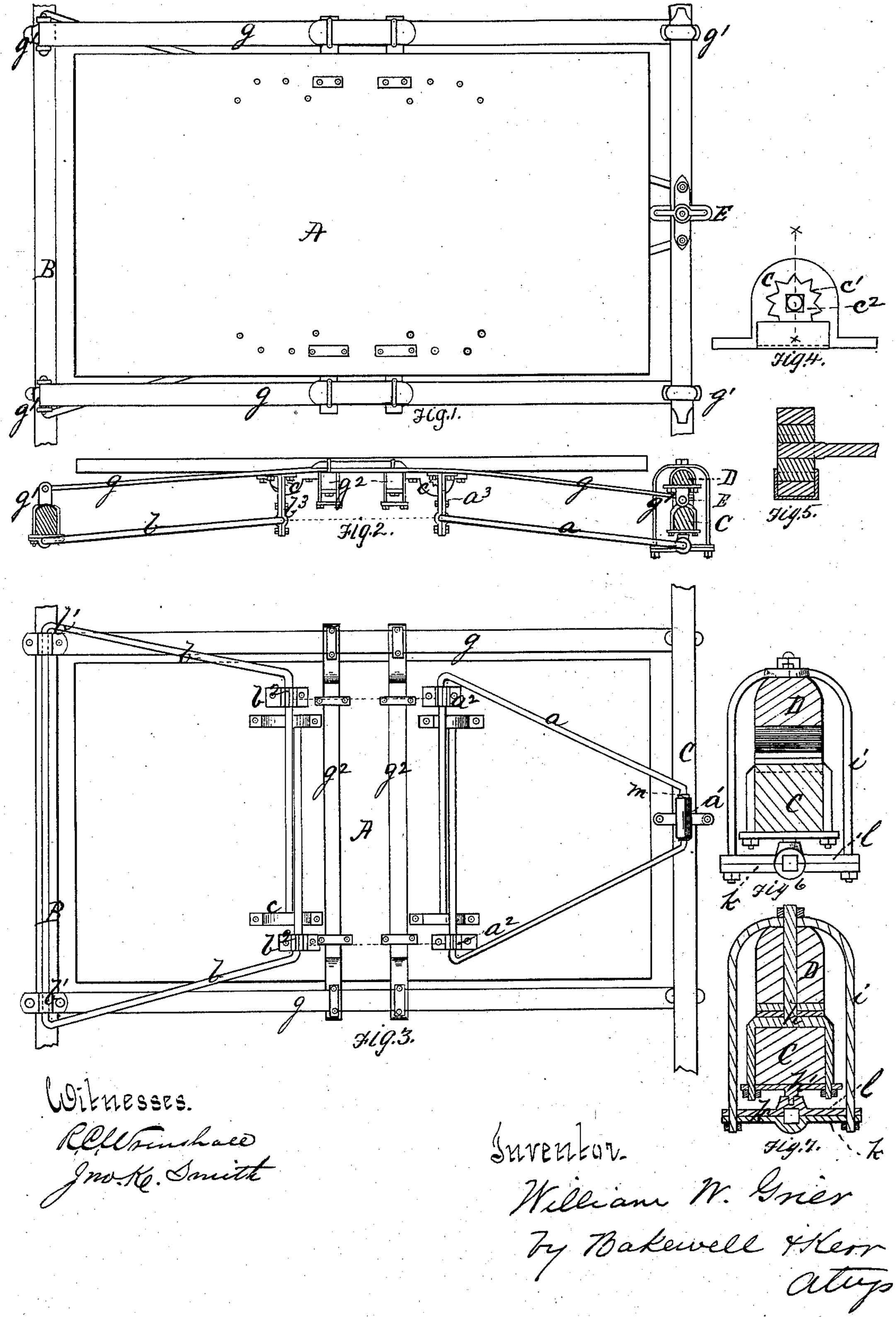

W. W. GRIER.
Vehicle-Spring.

No. 216,180. Patented June 3, 1879.

Witnesses.
R. C. Wrenshall
Jno. K. Smith

Inventor.
William W. Grier
by Bakewell & Kerr
attys

N. PETERS, PHOTO-LITHOGRAPHER, WASHINGTON, D. C.

UNITED STATES PATENT OFFICE.

WILLIAM W. GRIER, OF HULTON, PENNSYLVANIA.

IMPROVEMENT IN VEHICLE-SPRINGS.

Specification forming part of Letters Patent No. 216,180, dated June 3, 1879; application filed April 15, 1879.

*To all whom it may concern:*

Be it known that I, WILLIAM W. GRIER, of Hulton, in the county of Allegheny and State of Pennsylvania, have invented a new and useful Improvement in Vehicle-Springs; and I do hereby declare the following to be a full, clear, and exact description thereof, reference being had to the accompanying drawings, forming part of this specification, in which—

Figure 1 is a top view of devices embodying my invention. Fig. 2 is a side elevation. Fig. 3 is a bottom view. Figs. 4 and 5 are detail views, showing one manner of securing the ends of the torsion-springs, and also devices whereby the torsion may be regulated. Fig. 6 is a sectional view, showing one manner of connecting the forward torsion-spring to the under part of the fifth-wheel. Fig. 7 is a sectional view of the preferred form of fifth-wheel.

Like letters refer to like parts wherever they occur.

My invention relates to the construction of that class of "no-perch" vehicles wherein both torsion and semi-elliptic springs are employed; and consists, first, in the combination of torsion and semi-elliptic springs, arranged in different planes, the semi-elliptic springs being arranged in the upper plane and the torsion-springs in the lower plane, whereby the general appearance of a side-bar vehicle is obtained, together with the advantages of a no-perch vehicle; second, in the special shape and arrangement of the torsion-springs, whereby a long and efficient torsion is obtained, so that lighter torsion-rods may be employed and great ease of motion will result; third, in combining with the head-block clip and torsion-spring clamp-plates, which serve as yokes for the head-block clip as well as clamps to secure the torsion-spring.

Heretofore where torsion-springs and semi-elliptic springs have been used in combination in the construction of no-perch vehicles the torsion-springs have been located in the upper plane and the semi-elliptic springs in the lower plane, compelling the bed to be set higher to give sufficient length and pitch to the torsion-springs, and also exposing the torsion-springs to such an extent as to be more or less objectionable.

In the trade what are termed "side-bar" vehicles are considered desirable on account of their finish and elegance of appearance, but are more or less objectionable because the rigid connections of the gearing render them less easy of riding than no-perch vehicles, and less durable when used on rough roads.

The object of the present invention is, therefore, mainly to so combine and arrange semi-elliptic and torsion springs in the construction of a vehicle as to obtain the elegance of the side-bar with the advantages of the no-perch vehicle, and at the same time greatly reduce the cost of manufacture.

I will now proceed to describe my invention, so that others skilled in the art to which it appertains may apply the same.

In the drawings, A indicates the bed, B the hind axle, C the front axle, and D the head-block, of a no-perch vehicle. E indicates a fifth-wheel of any approved form, provided only it is provided with an eye, loop, or equivalent means for securing the front torsion-spring. It is here necessary to say the forward attachment of the front torsion-spring is preferably made to the fifth-wheel below the front axle, as shown, but not necessarily so, as it may be higher upon the fifth-wheel, or even to the head-block; but the latter is disadvantageous as affecting the pitch and torsion of the spring, and the attachment shown is advantageous as being a brace to the fifth-wheel, and also from the point of draft.

The preferred form of fifth-wheel E is that shown in Fig. 7, wherein $h$ is a clip king-bolt secured to the front axle, C, by the clip king-bolt yoke $h'$. $i$ indicates a head-block clip which incloses the head-block D and axle C, and is secured below by a yoke-plate, $k$, which, with its fellow $l$, form a clamp or bearing for the torsion-spring $a$, as at $a^1$. To prevent any rattling of the torsion-spring in the clamp or bearing a packing, $m$, of rubber, or its equivalent, may be employed.

$a$ is the front torsion-spring, formed of a bar or rod bent in the general form of a triangle, with its ends lapping, and arranged with its apex forward, and secured (preferably below the fifth-wheel) as shown at $a^1$. The torsion-spring may be free to turn in the bearing $a^1$, or if more power is required the bearing $a^1$ may be polygonal, and the rod made polygonal at that point, or so it will bind in the bearing, as shown in Fig. 6.

From the bearing $a^1$ the arms of the spring diverge toward the sides of the bed, extending sufficiently far to counteract any tendency to side motion when the load is unequally distributed on the bed, and at the points $a^2$ are journaled in pillars $a^3$, the lapping ends of the bar being separately and rigidly connected to the bed in any suitable manner, but preferably by means to be hereinafter described.

*b* represents the rear torsion-spring, which is a rod or bar bent into form of a quadrilateral, the ends of the bar lapping, as shown. This spring is clipped to the under side of the axle, as at $b^1$, so that it can move or turn slightly in its bearings, and is secured at $b^2$ in the same manner as torsion-spring *a* to pillars $b^3$ on the under side of bed A, its ends being separately rigidly secured to the bed, as before specified.

If desired, the pillars $a^3$ and $b^3$ may be connected by either rigid or spring cross-braces, as indicated by dotted lines, Figs. 2 and 3.

I will now describe the preferred form of securing the ends of the torsion-springs, so that the torsion of the springs can be altered at will.

To the bed or other fixed point where the end of the torsion-spring is to be secured I attach a metallic block, *c*, having a ratchet-opening, $c^1$, within which is detachably fitted a correspondingly-shaped disk or nut, $c^2$, having a central square or other shaped hole adapted to receive the end of the torsion-rod, which has been shaped to correspond.

In securing the parts I first put the disk or nut $c^2$ on the end of the torsion-rod, then slip it into the serrated opening of the block *c* and attach the block *c* to the bed or other fixed point. If the torsion is found to be too much or not enough, I loosen up the block *c*, change the position of disk or nut $c^2$ accordingly, and again secure the block.

It is evident that the disk $c^2$ and opening $c^1$ of the block might be hexagonal, octagonal, or equivalent form and have the same function; but I have chosen the shape which I think will give the best results in nicely and accurately adjusting the torsion.

For the upper springs I employ semi-elliptic springs *g*, usually and preferably arranged outside of the bed, in the position occupied by the side bars in a side-bar vehicle, and I connect or clip the said springs to the rear axle and head-block, as at $g^1$, connecting them rigidly to the bed at or near their mid-length by one or more braces or bars, $g^2$, so that there shall be a bond of union between the semi-elliptic and torsion springs, which will cause them to operate in unison.

In order to preserve the relation of the torsion and semi-elliptic springs substantially throughout their length, I prefer to clip the front ends of the semi-elliptic springs to the under side of the head-block D, but the same is not essential.

In constructing the vehicle to obtain the best results care should be taken to proportion and position the torsion and semi-elliptic springs, so that the projection of the axles due to change in position of the torsion-spring under average loads, &c., will be substantially the same as the projection due to change in the curve of the semi-elliptic springs from the same causes, which being done all rotation of the axle and side motion of the bed will be practically obviated.

The torsion-springs *a b* are useful and effective without the semi-elliptic springs, and may be used in the construction of various forms of vehicles known to the trade, and the devices for securing the ends of the torsion-springs are equally applicable to other torsion-springs. Therefore I do not wish to be understood as limiting my claim thereto to the single use and the combination shown.

The advantages of my invention are cheapness, lightness, and symmetry, together with the elegance of the side-bar and advantages of the higher-priced no-perch vehicles.

Having thus described the nature and advantages of my invention, what I claim, and desire to secure by Letters Patent, is—

1. The combination, in a no-perch vehicle, of torsion and semi-elliptic springs, the semi-elliptic springs arranged in the upper plane and rigidly connected to the bed, substantially in the manner and for the purpose specified.

2. The combination, with the bed of a vehicle, of the triangular torsion-spring *a* and quadrilateral torsion-spring *b*, having the ends of each respective spring lapping and secured to the bed, substantially as and for the purpose specified.

3. The combination, with the head-block clip, of the clamp-yoke plates and the torsion-spring, substantially as and for the purpose specified.

In testimony whereof I, the said WILLIAM W. GRIER, have hereunto set my hand.

WILLIAM W. GRIER.

Witnesses:
R. H. WHITTLESEY,
F. W. RITTER, Jr.,